United States Patent

[11] 3,628,174

[72] Inventors Thomas James Bridges
Holmdel;
Tao-Yuan Chang, Middletown, both of N.J.
[21] Appl. No. 24,703
[22] Filed Apr. 1, 1970
[45] Patented Dec. 14, 1971
[73] Assignee Bell Telephone Laboratories, Incorporated
Murray Hill, N.J.

[54] OPTICALLY PUMPED SUBMILLIMETER-WAVE AND MILLIMETER-WAVE GAS LASERS
12 Claims, 3 Drawing Figs.
[52] U.S. Cl. .................................................. 331/94.5,
330/4.3
[51] Int. Cl. .................................................. H01s 3/00
[50] Field of Search ........................................... 331/94.5;
330/4.3

[56] References Cited
OTHER REFERENCES

"Continuous Wave...$CH_3CN$," Applied Physics Letters, Vol. 8, No. 9, May 1966, Muller et al.

" Laser Emission from...Transitions" ; Appl. Phys. Letters, Vol. 11, No. 1, July 1967, Deutsch.

" Absolute...Lines," Physics Letter, Vol. 25A, No. 7, Oct. 1967.

*Primary Examiner*—Ronald L. Wibert
*Assistant Examiner*—Conrad Clark
*Attorneys*—R. J. Guenther and Arthur J. Torsiglieri

ABSTRACT: There is disclosed the first optically pumped submillimeter-wave laser. Oscillation is obtained on six pure rotational transitions of wavelength longer than 400 micrometers in methyl fluoride pumped at 9.55 micrometers and on several other pure rotational transitions between 280 micrometers and 687 micrometers in methyl alcohol vapor pumped at wavelengths between 9.52 and 9.71 micrometers. Vinyl chloride gas has yielded oscillation similarly at 388 and 630 micrometers when optically pumped by continuous-wave radiation at 9.55 and 10.61 micrometers, respectively. Other active media include molecular gases having dipole moments.

OPTICALLY PUMPED SUBMILLIMETER-WAVE AND MILLIMETER-WAVE GAS LASERS

BACKGROUND OF THE INVENTION

This invention relates to millimeter- and submillimeter-wave lasers and laser amplifiers.

The shorter millimeter-wave and submillimeter-wave portion, roughly 3 millimeters to 30 micrometers (hereafter called the submillimeter portion) of the electromagnetic spectrum has heretofore been relatively inaccessible for experimentation and practical utilization because of the lack of adequate sources and amplifiers in this wavelength region.

Were such sources and amplifiers available, communication via submillimeter wave transmission would become feasible, perhaps at an earlier date than infrared and visible optical communication links.

While many materials are known to have absorptive or emissive transitions in this wavelength region, it has not been an easy task to determine which materials can be pumped in what way to provide population inversion and useful stimulated emission in the submillimeter region of the spectrum.

SUMMARY OF THE INVENTION

We have discovered the first optically pumped submillimeter-wave gas laser, oscillating in the region from 100–1000 micrometers upon pure rotational transitions of a molecular gas having an electric dipole moment and being pumped at the infrared wavelength of a vibrational-rotational absorption.

Specifically, we have discovered submillimeter lasing action on six pure rotational transitions in methyl fluoride gas pumped at 9.55 micrometers. The six rotational transitions are grouped in pairs near 452, 496 and 541 micrometers. The measured gains of these transitions are surprisingly high and are therefore attractive for use in laser amplifiers, as well as in the oscillators that we have tested.

We have also discovered laser action near 565, 687, 391 and 280 micrometers in methyl alcohol vapor optically pumped at 9.52, 9.68, 9.69 and 9.71 micrometers, respectively, and near 388 and 630 micrometers in vinyl chloride gas optically pumped at 10.61 and 9.55 micrometers, respectively.

BRIEF DESCRIPTION OF THE DRAWING

Other features and advantages will become apparent from the following detailed description, taken together with the drawing, in which.

DESCRIPTION OF ILLUSTRATIVE EMBODIMENTS

Figure 1:
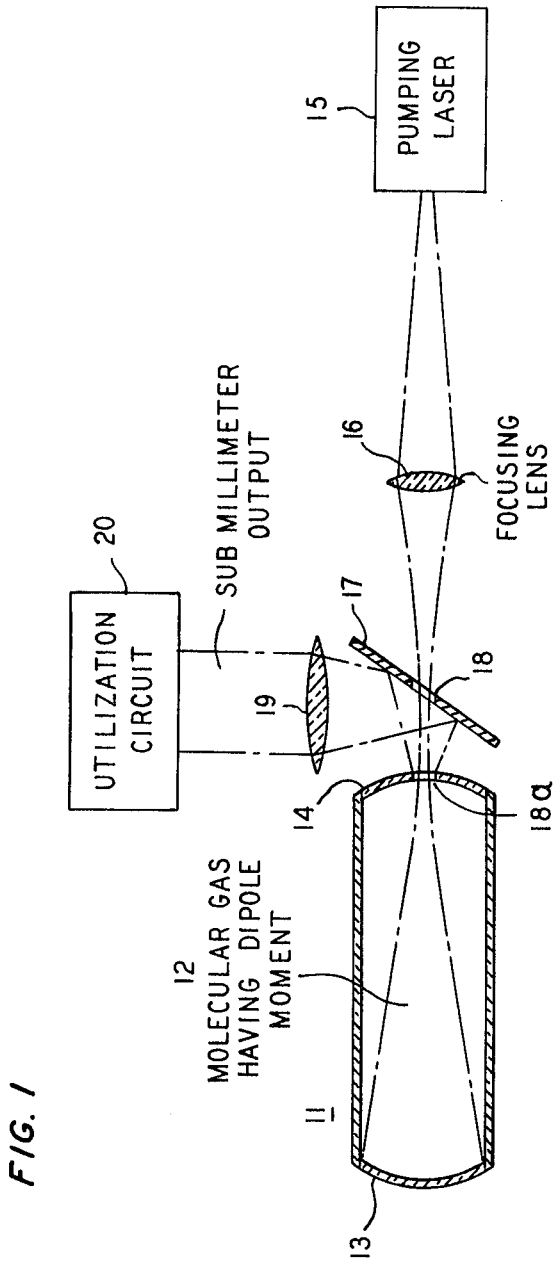
FIG. 1 is a partially pictorial and partially block diagrammatic illustration of apparatus employing laser oscillations according to our invention.

In the embodiment of FIG. 1, submillimeter-wave oscillation is provided in an apparatus 11 in which methyl fluoride ($CH_3F$) gas 12 or methyl alcohol or vinyl chloride or other molecular gas having a dipole moment is pumped by infrared light reflected between the back reflector 13 and front reflector 14. The apparatus 11 may have its axis slightly misaligned with respect to pumping source 15 to allow multiple nonreentrant passage of the pump between 13 and 14 without substantial back-coupling to the laser pumping source 15. The pumping light is focused by a lens 16 through a coupling hole 18 in the metallic 45° reflector 17 and coupling hole 18a in reflector 14. The hole 18a also provides output coupling for the submillimeter oscillation. Because of strong diffraction at the comparatively long wavelength, the beam diverges strongly and the hole 18 provides substantially no loss for the submillimeter-wave stimulated radiation, nearly all of the latter being reflected from mirror 17 and focused by lens 19 into utilization apparatus 20. The reflectors 13 and 14 are illustratively gold coated and form a resonator at the submillimeter wavelengths.

The utilization apparatus 20 could include a sample of material (to be investigated) and spectroscope, as employed in molecular spectroscopy.

The pumping laser source 15 is illustratively a carbon dioxide molecular laser of known type oscillating at 9.55 $\mu$m., a wavelength at which the methyl fluoride gas in laser 11 has a vibrational-rotational absorption.

A vibrational-rotational absorption involves a transition between different vibrational levels, each of which includes several rotational levels. Typically, the absorbing transition occurs between one rotational level of one lower vibrational level and one rotational level of a higher vibrational level.

In contrast, each pure rotational transition upon which oscillation occurs in laser 11 is a transition between a rotational level of one vibrational level and another rotational level of the same vibrational level.

In the operation of the embodiment of FIG. 1, when illustratively methyl fluoride gas is used, several different regimes of submillimeter-wave oscillation have been observed. When the pumping laser source is pulsed by Q switching, pulsed laser oscillation has been observed on six rotational transitions grouped in pairs near 452, 496 and 541 micrometers. When the pumping laser source is continuous, continuous-wave oscillation has been observed on the transitions near 496 micrometers.

The wavelengths of these transitions and the rotational levels involved are attributed to the $\nu_3$ mode, which involves carbon-fluorine bond stretching within the methyl fluoride molecule. Vibrational-rotational transitions among the vibrational-rotational energy levels, with selection rules $\Delta v=\pm 1$; $\Delta J=\pm 1, 0$; $\Delta K=0$, give rise to an absorption band near 9.55 micrometers.

The vibrational quantum number is $v$ and $J$ and $K$ are rotational quantum numbers related to the total angular momentum and the axial component of angular momentum, respectively. Since the $CH_3F$ molecule has a permanent electric dipole moment, pure rotational transitions are also allowed, with selection rules $\Delta v=0$, $\Delta J=\pm 1$, and $\Delta K=0$.

While one of us, Chang, with others had recently demonstrated resonant absorption on one of the vibrational-rotational transitions of methyl fluoride at 9.55 micrometers and demonstrated its ability to Q switch the $CO_2$ laser at this wavelength, we have subsequently discovered that several pure rotational transitions can be inverted by optical pumping at this wavelength.

The pair of transitions near 496 micrometers in methyl fluoride result from population inversion between the $J=12$ and 11 levels of the $v=1$ vibrational state; and the pair of transitions near 452 micrometers result from population inversion between the $J=13$ and 12 levels in the $v=0$ vibrational state. Cascade oscillation also occurs on a pair of transitions corresponding to the $J=11$ to $J=10$ transition in the $v=1$ vibrational state, for different values of the quantum number $K$ related to the axial component of angular momentum. In each case, the transitions of the pair have the $K$ values 1 and 2, respectively.

In our experiments, the Q-switched pumping pulse width was approximately 0.28 microseconds; and the peak power entering the resonator of laser 11 was about 1.5 kilowatts. After entering the resonator, the 9.55 micrometer pumping laser beam spreads and becomes effectively trapped between reflectors 13 and 14 for a large number of round trips. The slight misalignment of apparatus 11 with respect to source 15 reduces the losses of the pumping beam at the coupling aperture during these multiple reflections and enables the pumping beam to traverse all of the active medium.

We obtained the above-described submillimeter-wave oscillations for $CH_3F$ pressures ranging from a few millitorrs to about 1 torr.

The oscillation bandwidth of each of the lines was measured by beating the submillimeter-wave output with harmonics of an accurately tunable microwave signal source in a point contact diode. In fact, the microwave signal source, harmonic generator and the point contact diode are an illustrative utilization apparatus 20.

The three observed wavelengths match correctly the expected transitions. The emission of the cascade transition is enhanced when there is simultaneous emission of the higher $J$-value transition of the $v=1$ level, but can oscillate even in its absence by the mechanism of resonant collisions that change the $J$-value of the excited molecules by unity.

The submillimeter-wave output is found to be always polarized perpendicular to the pump polarization for the case, as in our experiments, in which the absorptive vibrational-rotational transition of the active medium is a so-called Q-branch transition.

The relative polarizations of the pumping radiations and output radiations can be obtained from a classical model of an axially vibrating (at $v_r$) electrical dipole which is rotating at $v_R$ about an axis not coincident with the dipole axis. The radiation at $v_r$ (the Q-branch transition) from, or absorbed by, such a dipole will be polarized along the rotation axis; while the radiations at $v_r \pm v_R$ (the R-branch and P-branch transitions) and $v_R$ (the pure rotational transition) will be polarized perpendicular to the rotation axis.

An estimate of the gain of the optically pumped medium gave a value of about 27 decibels per meter, an unusually high value for a laser medium.

In the continuous-wave operation of the device a pumping power of about 2 watts was used. Admixtures of other gases were found to be advantageous in this application by increasing the power output. Such gases have the effect of depopulating the upper vibrational level of the pump transition so that the level does not fill excessively during continuous pumping. Gases useful for this purpose include He, $PF_3$ and $SF_6$.

For the case of methyl alcohol vapor used as an active constituent of the laser, continuous-wave pumping by the $CO_2$ laser at 9.52, 9.68, 9.69 and 9.71 micrometers produced laser action near 565, 687, 391 and 280 micrometers, respectively. The principle of operation of the methyl alcohol laser is essentially identical to that of the methyl fluoride laser. Stretching of the C—OH bond is apparently involved.

Similarly, vinyl chloride gas has yielded oscillation near 388 and 630 micrometers in response to continuous-wave pumping from the carbon dioxide laser 15 at 10.61 and 9.55 micrometers, respectively. Again, this gas has a dipole moment; and $CH_2$ rocking and CH wagging modes are apparently involved.

Our above-described demonstration of a new type of laser source in the submillimeter region of the spectrum is illustrative of a family of similar devices based on pure rotational transitions pumped via a vibrational-rotational absorption in gas molecules having an electric dipole moment. For example, different output wavelengths may be expected from other hydrocarbons having a carbon-fluoride bond and a dipole moment. Examples are: $CD_3F$, $CCl_3F$, $CHClF$, $CF_2=CClF$, $CF_2=CB_rF$, $CCl_2=CClF$, $CHCl=CClF$, $CH_2=CClF$, $CH_3·CH_2F$, $CHCl_2·CClF$, $CHCl_2·CHClF$, $CCl_3·CCl_2F$, $CH_2=CFCH_3$, $C_6H_5F$ and their isotopic variations.

Still further, the following gases and vapors and their isotopic variations appear to have promising pure rotational transitions in the submillimeter and millimeter-wave region and a vibrational-rotational absorption that can be pumped by the known high-power molecular lasers or other near infrared lasers:

$CH_3OH$, $C_2H_5OH$, $C_3H_5OH$, $C_3H_7OH$, $C_4H_9OH$, $HCOOH$, $CH_3NH_2$, $C_2H_5NH_2$, $CH_3C\equiv CH$, $CH_3CN$, $CH_2=CHCH_3$, $C_2H_3OOH$, $CH_3COCH_3$, $CH_2=CHF$, $CH_2=CHCl$, $CH_2=CHB_r$, $CH_3SH$, $CH_3NC$, $NH_3$ There are, no doubt, many other similar compounds which may be discovered to give similar action.

The laser transitions which we have discovered should also be useful in submillimeter-wave communication, both in local oscillators and carrier sources and in amplifiers at transmitter and receiver, particularly because of the high gain of these transitions. A modification of the embodiment of FIG. 1 for amplification of a modulated submillimeter-wave input is shown in FIG. 2.

Figure 2:
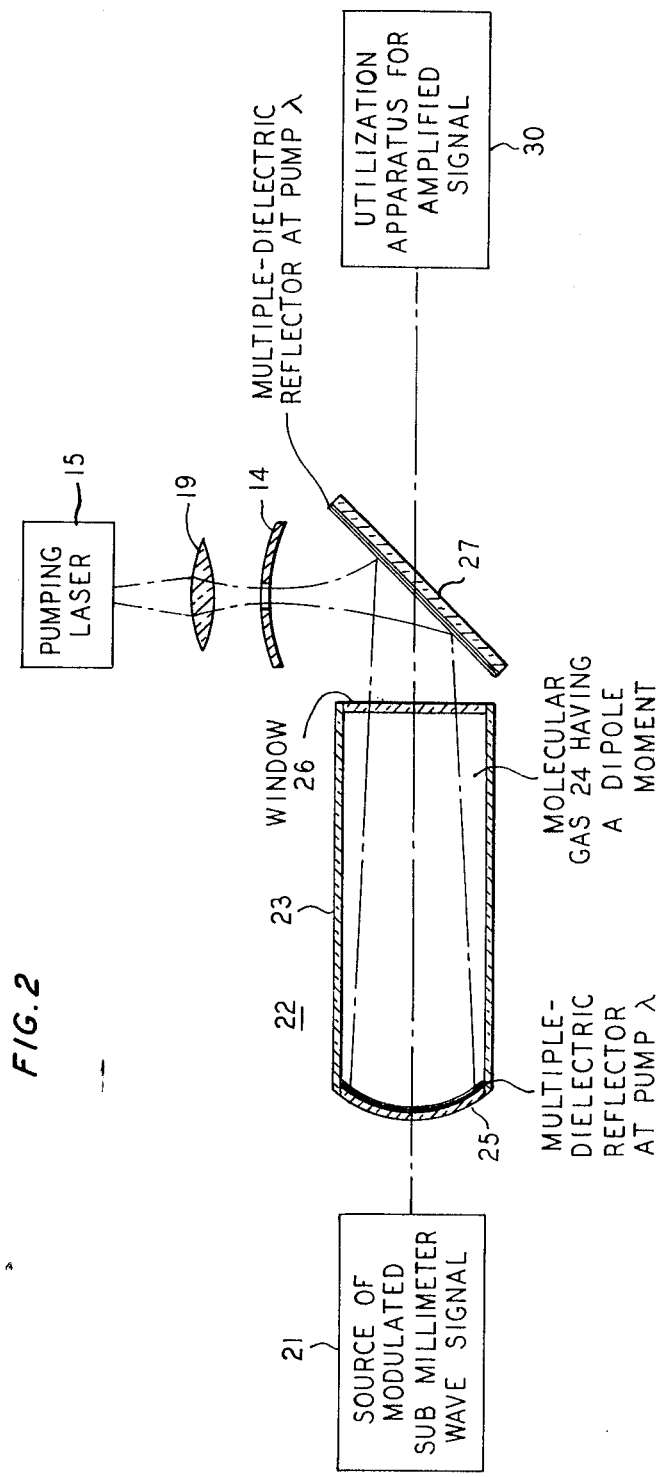
FIG. 2 illustrates a modification of the embodiment of FIG. 1 to employ laser amplification according to our invention.

In FIG. 2 components numbered as in FIG. 1 are the same as in FIG. 1.

A source 21 of a modulated submillimeter-wave signal is disposed to supply the modulated signal in a beam along the axis of the cell 23 containing the active gas 24 of the submillimeter-wave amplifier. This beam passes readily through the pump reflector 25, which is typical optical-quality quartz having on its inner surface quarter-wavelength dielectric layers at the pump wavelengths. These layers, made by conventional techniques, are highly transparent at submillimeter wavelengths; and the opposite surface of the quartz substrate may be antireflection coated for submillimeter-waves.

After passage through gas 24, illustratively methyl fluoride, the submillimeter-wave beam passes through window 26 and dichroic beam-splitter 27, which is coated similarly to reflector 25, and is received by utilization apparatus 30, which is illustratively a detector.

By reflection, beam-splitter 27 forms a part of the nonreentrant multiple-pass arrangement for the pumping radiation between reflector 14 and reflector 25.

One variation of the arrangement shown in FIG. 2 has both the lens 19 and the reflector 14 eliminated and the reflectors 25 and 27 are used as integral parts of the pump laser.

Another variation of the said arrangement uses a diffraction grating in place of the reflector 25. The grating should have illustratively 60 to 120 grooves per millimeter and should be properly blazed to reflect the pump beam primarily by the first order diffraction, while reflecting the submillimeter or millimeter radiation by specular or zero order reflection. Still further, the reflector 27 in FIG. 2 can also be replaced by a diffraction grating similar to the one just described.

In yet another variation metallic mesh of a known type may be used as a dichroic mirror for reflectors 25 and 27.

In operation, the outstanding characteristic of the embodiment of FIG. 2 is the high gain provided by amplifier 22 at the submillimeter wavelengths.

The laser of FIG. 1 can also be implemented in an easily constructed arrangement and, if desired, without the metallic apertured plate 17. Such an implementation is shown in FIG. 3.

Figure 3:
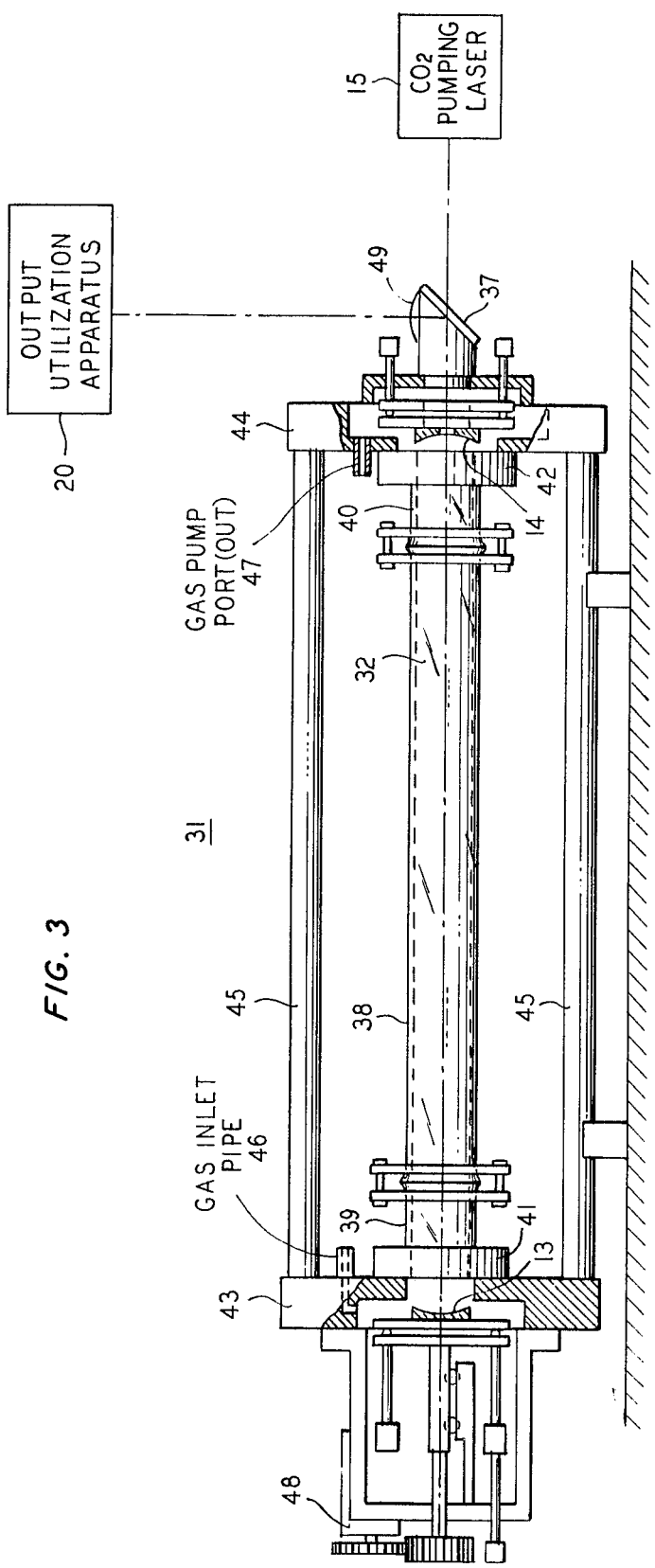
FIG. 3 is an elevation of a preferred construction of apparatus according to our invention.

Of principal noteworthiness in FIG. 3 is that the potassium chloride plate 37 passes most of the 9.55 micrometer pumping beam while reflecting most of the submillimeter radiation from the methyl fluoride gas 32.

The tube 38 of the laser 31 is 3 inches in diameter and made of oil-quenched glass, of known type, which has its outer surface in continuous compression. The tube 38 is sealed to the tubular couplings 39 and 40 by simple pressure clamps. The couplings 39 and 40 are seated in rigid extensions 41 and 42 of mirror mounts 43 and 44, which are joined by four low-expansion bars 45 (typically INVAR).

A gas inlet pipe 46 and pump port 47, the outlet, are provided to facilitate continuous flow of the methyl fluoride gas. The flow can be very slow or absent because virtually no deleterious effects on the quality of the gas are associated with the optical pumping, in contrast to electrical discharge pumping.

The back reflector is mounted for pure translational movement on ball bearings in response to a mechanical linkage driven by servomotor 48 to tune the resonator for the submillimeter wavelengths.

It may be noted that the output submillimeter-wave beam experiences rather substantial diffraction at its output aperture 18a, because its wavelength is substantial compared with the aperture size. Thus, it is desirable that it be focused immediately, for example, by the lens 49 mounted directly on the top surface of an extension of the mirror mount. A conical horn (not shown) at the aperture 18a may be used to reduce the beam divergence in a known manner.

As in FIG. 1, the submillimeter-wave radiation is substantially unaffected by the slight misalignment of the laser axis; but the much shorter wavelength pumping radiation is caused to undergo multiple nonreentrant reflections therebetween in order to increase the pumping efficiency.

In other respects, the operation of the embodiment of FIG. 3 is like that of FIG. 1.

In another similar embodiment the whole apparatus as in FIG. 3, less the glass tubes 38, 39, 40, can be placed in a metallic or other box with suitable windows transparent to the pumping and submillimeter radiation. Such an arrangement is possible because of the absence of electrical discharge in the lasing medium.

We claim:

1. Apparatus for the stimulated emission of radiation, comprising a gaseous medium including as an active constituent a molecular gas having a vibrational-rotational absorption and an electric dipole moment, means for pumping said medium with radiation of wavelength matching the wavelength of said vibrational-rotational absorption, thereby selectively inverting the population of a pure rotational transition within said gas, means for stimulating the emission of radiation from said rotational transition, and means for extracting a portion of said radiation for utilization.

2. Apparatus according to claim 1 in which the active constituent consists of molecules having a carbon-fluorine bond.

3. Apparatus according to claim 1 in which the active constituent is selected from the group consisting of methyl fluoride, vinyl chloride, formic acid, fully halinated hydrocarbons having at most three carbon atoms per molecule, and alcohols having at most three carbon atoms per molecule.

4. Apparatus according to claim 1 in which the active constituent consists of methyl fluoride ($CH_3F$) molecules.

5. An apparatus for amplifying a supplied beam of submillimeter radiation, comprising a gaseous medium including as an active constituent a molecular gas having a vibrational-rotational absorption and an electric dipole moment, means for pumping said medium with radiation of wavelength matching the wavelength of said vibrational-rotational absorption, thereby selectively inverting the population of a pure rotational transition of said gas at the frequency of said supplied beam of radiation, means for admitting the supplied beam to said gas to stimulate the emission of radiation from said rotational transition, and means for extracting a portion of the supplied beam and the emitted radiation as an amplified beam of submillimeter-wave radiation.

6. Apparatus according to claim 1 in which the means for stimulating the emission of radiation comprises an optical resonator having an optical axis, the pumping means comprises a source of coherent pumping light supplied axially to said optical resonator, and the extracting means comprises a beam-splitter capable of angularly separating the pumping light and the radiation emitted from the rotational transition.

7. Apparatus according to claim 6 in which the active constituent is a hydrocarbon having a carbon-fluorine bond and the source of coherent pumping light includes a laser oscillating at about 10 micrometers.

8. Apparatus according to claim 7 in which the pumping laser is a gaseous molecular laser adapted to supply coherent pumping light at about 9.55 micrometers, and the active constituent of the apparatus is methyl fluoride gas, the stimulating means including an optical resonator including metallic-coated reflectors and being adapted to promote oscillations at about 452, 496 and 541 micrometers.

9. Apparatus according to claim 7 in which the pumping laser is a gaseous molecular laser and the active constituent of the apparatus is methyl alcohol vapor, the stimulating means including an optical resonator including metallic-coated reflectors and being adapted to promote oscillations at a wavelength near one of the following wavelengths: 280 micrometers, 391 micrometers, 565 micrometers and 687 micrometers.

10. Apparatus according to claim 1 in which the active constituent consists of methyl alcohol molecules.

11. Apparatus according to claim 7 in which the pumping laser is a gaseous molecular laser and the active constituent of the apparatus is vinyl chloride vapor, the stimulating means including an optical resonator including metallic-coated reflectors and being adapted to promote oscillations at a wavelength near one of the following wavelengths: 388 micrometers and 630 micrometers.

12. Apparatus according to claim 1 in which the active constituent consists of vinyl chloride vapor.

* * * * *